(12) United States Patent
Endo et al.

(10) Patent No.: US 12,153,258 B2
(45) Date of Patent: Nov. 26, 2024

(54) OPTICAL CONNECTING STRUCTURE

(71) Applicant: Nippon Telegraph and Telephone Corporation, Tokyo (JP)

(72) Inventors: Jun Endo, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 401 days.

(21) Appl. No.: 17/431,876

(22) PCT Filed: Apr. 2, 2020

(86) PCT No.: PCT/JP2020/015159
§ 371 (c)(1),
(2) Date: Aug. 18, 2021

(87) PCT Pub. No.: WO2020/213411
PCT Pub. Date: Oct. 22, 2020

(65) Prior Publication Data
US 2022/0057578 A1     Feb. 24, 2022

(30) Foreign Application Priority Data
Apr. 15, 2019 (JP) ................... 2019-076829

(51) Int. Cl.
G02B 6/26      (2006.01)
(52) U.S. Cl.
CPC ........................ G02B 6/26 (2013.01)

(58) Field of Classification Search
CPC ........................................................ G02B 6/26
See application file for complete search history.

(56) References Cited

U.S. PATENT DOCUMENTS

| 5,124,281 A | 6/1992 | Ackerman et al. |
| 2004/0042739 A1* | 3/2004 | Maeno ..................... G02B 6/32 |
| | | 385/33 |
| 2004/0218870 A1* | 11/2004 | Blauvelt .............. G02B 6/2746 |
| | | 385/50 |
| 2008/0131052 A1 | 6/2008 | Matsumura et al. |
| 2016/0282578 A1* | 9/2016 | Childers ............... B41F 23/045 |
| 2017/0299815 A1* | 10/2017 | Sakamoto ........... G02B 6/4267 |

FOREIGN PATENT DOCUMENTS

| JP | 104261076 A | 9/1992 |
| JP | H105196825 A | 8/1993 |
| JP | H0868927 A | 3/1996 |
| JP | 2001083372 A | 3/2001 |
| JP | 2010224420 A | 10/2010 |
| WO | 2006082625 A | 8/2006 |

* cited by examiner

*Primary Examiner* — Sung H Pak
*Assistant Examiner* — Hoang Q Tran
(74) *Attorney, Agent, or Firm* — Slater Matsil, LLP

(57) ABSTRACT

An optical connection structure includes a waveguide substrate; a Si waveguide formed on one surface of the waveguide substrate 100 and having a first end surface; an optical fiber having a second end surface facing the first end surface; a terrace section extending further toward the optical fiber side from an end portion on the optical fiber side of the waveguide substrate; and a support member formed on the terrace section, and including, on a top surface in a view from the terrace section, a recess c configured to support a lens.

19 Claims, 16 Drawing Sheets

OPTICAL CONNECTING STRUCTURE

CROSS-REFERENCE TO RELATED APPLICATIONS

This application is a national phase entry of PCT Application No. PCT/JP2020/015159, filed on Apr. 2, 2020, which claims priority to Japanese Application No. 2019-076829, filed on Apr. 15, 2019, which applications are hereby incorporated herein by reference.

TECHNICAL FIELD

The present invention relates to an optical connection structure, and particularly relates to a mode field conversion technique in which a mode field diameter of input light is converted and output.

BACKGROUND

A waveguide constituting an optical device to supply a light source and perform modulation in the optical communication field generally has a mode field diameter of 1 μm or less, but a mode field diameter of an optical fiber for transmitting the optical signal is approximately 10 μm in the case of a single mode fiber. To couple the optical device and the optical fiber with high efficiency, the mode fields need to be matched.

As a method for coupling an optical device and an optical fiber, a related technique has been known in which an optical system is constituted by three-body alignment of an optical device, an optical element such as a lens, and an optical fiber. This known technique is effective to achieve high coupling efficiency, but increases production costs because the alignment processing of the optical device, lens, and optical fiber is required.

In order to reduce the alignment processing, an optical fiber at the tip of which a lens is integrally formed has been proposed (see Patent Literature (PTL 1)). In addition, for example, as illustrated in FIG. 10, PTL 2 discloses a technique in which a groove for fixing a lens 310 is formed in advance in a substrate 300 to be used for manufacturing an optical device, by utilizing a crystal orientation of the substrate material. This technique is called a passive alignment technique.

However, in a known optical fiber with a lens attached, for example, it is difficult to sufficiently convert a mode field on the order of sub-microns like in a silicon waveguide used in silicon photonics, to a mode field of the optical fiber. Because of this, there arises a problem that the coupling efficiency is lowered, and it is difficult to produce a surface shape of the lens portion with good reproducibility.

On the other hand, in a known technique using the passive alignment in which a groove is formed in a substrate, an oblique machined surface is formed by utilizing the crystal anisotropy of silicon. Because of this, it is fundamentally difficult to form a groove having any shape independent of the crystal orientation. In addition, there is also a possibility that the waveguide is damaged depending on the groove formation procedure.

CITATION LIST

Patent Literature

PTL 1: JP 2010-224420 A
PTL 2: JP 4-261076 A.

SUMMARY

Technical Problem

Embodiments of the present invention have been conceived to solve the problems described above, and an object thereof is to provide an optical connection structure in which alignment processing between a waveguide and an optical element is reduced, thereby making it possible to form the optical connection structure more easily.

Means for Solving the Problem

In order to solve the problems described above, an optical connection structure according to embodiments of the present invention includes a substrate; a first waveguide that is formed on one surface of the substrate and includes a first end surface; a second waveguide that includes a second end surface facing the first end surface; a terrace that extends further toward the second waveguide side from an end portion on the second waveguide side of the substrate; and a support member that is formed on the terrace, and includes, on a top surface in a view from the terrace, a recess configured to support an optical element.

In the optical connection structure according to embodiments of the present invention, the recess may engage with part of the optical element.

The optical connection structure according to embodiments of the present invention may further include an adhesive configured to bond the recess of the support member to the optical element.

In the optical connection structure according to embodiments of the present invention, the recess may correspond to a shape and a size of the part of the optical element.

In the optical connection structure according to embodiments of the present invention, the recess may be formed in a groove shape.

The optical connection structure according to embodiments of the present invention may further include a connection layer that is formed of a material having a refractive index smaller than a refractive index of the optical element, and is configured to cover the support member and the optical element between the first end surface and the second end surface.

In the optical connection structure according to embodiments of the present invention, the support member may be constituted of a light curing resin material.

In the optical connection structure according to embodiments of the present invention, a plurality of the support members may be provided.

Effects of Embodiments of the Invention

According to embodiments of the present invention, since there is provided a support member that is formed on a terrace, and includes, on a top surface in a view from the terrace, a recess configured to support an optical element, it is possible to provide an optical connection structure in which the alignment processing between the waveguide and the optical element is reduced, so that the optical connection structure may be more easily formed.

DETAILED DESCRIPTION OF ILLUSTRATIVE EMBODIMENTS

Embodiments of the present invention will be described in detail below with reference to FIG. 1 to FIG. 9. Common constituent elements to each drawing are labeled with the same reference signs.

Figure 1:
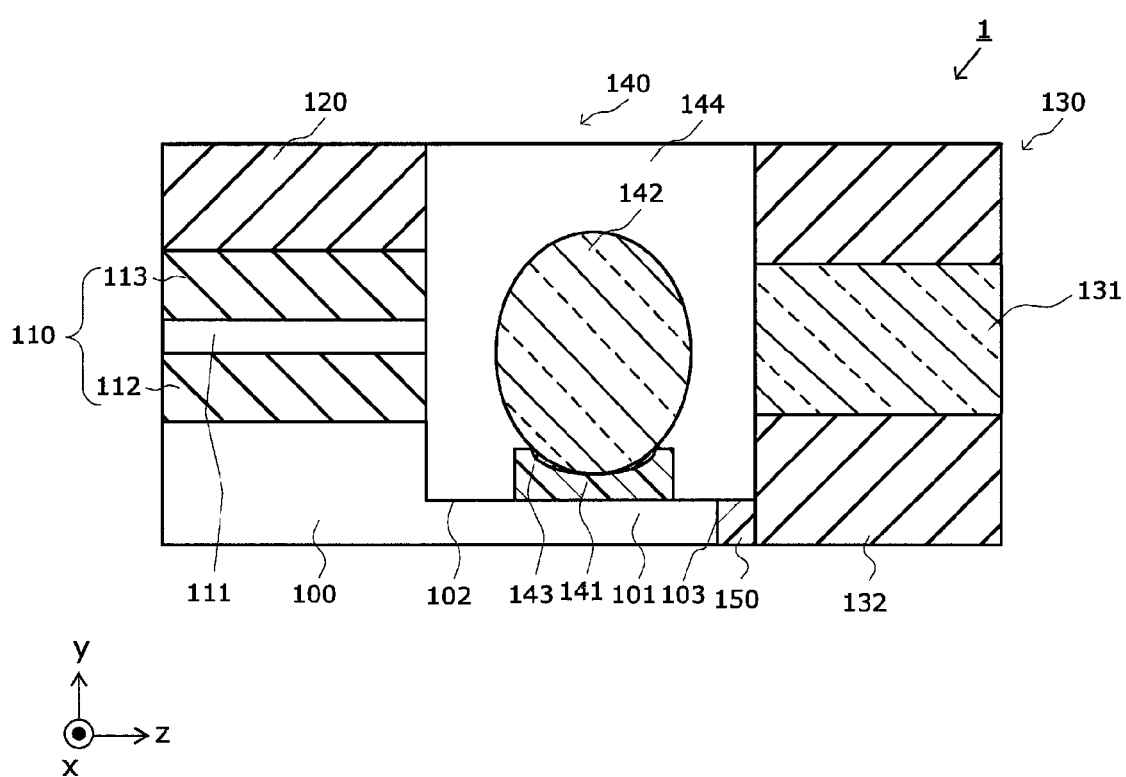
FIG. 1 is a schematic cross-sectional view of an optical connection structure according to an embodiment of the present invention.

FIG. 1 is a schematic cross-sectional view of an optical connection structure 1 according to an embodiment of the present invention. The optical connection structure 1 according to the present embodiment includes a waveguide substrate (substrate) 100 having a terrace section 101; a Si waveguide (first waveguide) 110; an optical fiber (second waveguide) 130; and a connection layer 140 including a lens (optical element) 142 supported by a support member 141 disposed between an end surface (first end surface) of the Si waveguide 110 and an end surface (second end surface) of the optical fiber 130.

The optical connection structure 1 converts a mode field diameter of light input to the Si waveguide 110 and couples it to the optical fiber 130.

It is assumed in the description below that x, y, and z axes illustrated in each of the drawings including FIG. 1 are orthogonal to one another, and the vertical direction is set as the y axis, the horizontal direction is set as the x axis, and the propagation direction of light, that is, the direction along an optical axis is set as the z axis.

In addition, in the present embodiment, a case in which light is input from the Si waveguide 110 and propagates to the optical fiber 130 will be described.

First, an outline of the optical connection structure 1 according to the present embodiment is described below.

In the optical connection structure 1 according to the present embodiment, the terrace section (terrace) 101 extending toward the optical fiber 130 side from a position of an outgoing end surface of the Si waveguide 110, is formed at an end portion on the optical fiber 130 side of the waveguide substrate 100, on the surface of which the Si waveguide 110 is formed. The support member 141 is disposed on a surface 102 of the terrace section 101, and the support member 141 engages with part of the lens 142 to support the lens 142.

In addition, an end surface 103 on the optical fiber 130 side of the terrace section 101 is formed to be a flat plane orthogonal to the optical axis of the light propagating through the Si waveguide 110, and is joined to the end surface of the optical fiber 130 with an adhesive layer 150 interposed therebetween. A space formed by the surface 102 of the terrace section 101, the outgoing end surface of the Si waveguide 110, and the end surface of the optical fiber 130 is filled with a filler 144 to cover the lens 142 supported by the support member 141, thereby forming the connection layer 140. The connection layer 140 is provided between the outgoing end surface of the Si waveguide 110 and the end surface of the optical fiber 130 facing the outgoing end surface, and constitutes an optical system in the optical connection structure 1.

In this manner, the optical connection structure 1 according to the present embodiment focuses or collimates the outgoing light from the Si waveguide 110 by the lens 142 supported by the support member 141 disposed on the terrace section 101, and couples the light to the optical fiber 130.

Each constituent element of the optical connection structure 1 according to the present embodiment will be described below.

The waveguide substrate 100 is formed in a plate shape. The waveguide substrate 100 is formed of a Si material. The Si waveguide 110 is formed on part of a surface (one surface) of the waveguide substrate 100. A rear surface of the waveguide substrate 100 is formed to be flat.

The terrace section 101 is formed at the end portion on the optical fiber 130 side of the waveguide substrate 100, and extends toward the optical fiber 130 side relative to the position of the end surface of the Si waveguide 110 in an optical axis direction connecting the end surface of the Si waveguide 110 and the end surface of the optical fiber 130. The surface 102 of the terrace section 101 is formed so that the position thereof is lower than that of a surface on which the Si waveguide 110 is formed. In other words, the thickness (y axis) of the terrace section 101 is thinner than the thickness of the waveguide substrate 100 in a region where the Si waveguide 110 is formed. The end surface 103 on the optical fiber 130 side of the terrace section 101 has a flat plane orthogonal to the optical axis, and connects to the optical fiber 130 with the adhesive layer 150 interposed therebetween.

The terrace section 101 has the surface 102 formed on a flat plane parallel to the optical axis (z axis) of the Si waveguide 110 and the x axis orthogonal to the optical axis (x-z plane), for example. The support member 141 is disposed on the surface 102 of the terrace section 101.

The terrace section 101 of the waveguide substrate 100 may be formed by a known semiconductor manufacturing process. In addition, the end surface on the optical fiber 130 side of each of the waveguide substrate 100, the Si waveguide 110, and a block 120 to be described below may be formed to be a flat plane orthogonal to the optical axis (z axis) by cutting work, for example, to form the terrace section 101. Furthermore, the surface 102 and the end surface 103 having been cut of the terrace section 101 may be polished.

The Si waveguide 110 includes a core 11, and a lower clad 112 and an upper clad 113 covering the core 111. The Si waveguide 110 is disposed in a region on the surface of the waveguide substrate 100 on the light incident side in the optical connection structure 1. In other words, the Si waveguide 110 is formed in a region on part of the surface of the waveguide substrate 100. As illustrated in FIG. 1, for example, the core in, the lower clad 112, and the upper clad 113 may be formed to have a set shape toward the optical fiber 130. The end surface on the light outgoing side of the Si waveguide 110 has a flat plane orthogonal to the optical axis.

The core in may be formed of Si as a material. The lower clad 112 and the upper clad 113 may be formed of $SiO_2$ as a material.

On a surface of the upper clad 113 of the Si waveguide 110, the block 120 is provided as a dummy block for adjusting the height of the optical connection structure 1. The length along the optical axis of the block 120 matches the length along the optical axis of the Si waveguide 110. In addition, the block 120 is formed to have a thickness (y axis direction) such that the height in the y axis direction of the waveguide substrate 100 and the waveguide including the Si waveguide 110 comes to have a desired height, for example, a height matching the height in the y axis direction of the optical fiber 130. The block 120 is formed of a quartz-based material or a resin material. It is more preferable that the block 120 use a material having a thermal expansion coefficient close to that of the lower clad 112 and upper clad 113 of the Si waveguide 110.

The optical fiber 130 includes a core 131 and a clad 132 being formed covering the core 131. A quartz-based material, for example, is used for the optical fiber 130, but the optical fiber 130 may be formed by other inorganic materials or organic materials (for example, polymers).

The core 131 is provided at the center of the optical fiber 130, and propagates the light, the mode field of which has been converted by the Si waveguide 110. Note that the core 131 is not limited to a case of having a circular cross section, and may have a rectangular shape like a planar light-wave circuit, for example. The clad 132 is formed to cover the outer circumferential surface of the core 131.

The connection layer 140 is formed between the end surface of the Si waveguide 110 and the end surface of the optical fiber 130 on the surface of the terrace section 101 formed at the end portion of the waveguide substrate 100. The connection layer 140 constitutes the optical system in the optical connection structure 1.

More specifically, the connection layer 140 includes the support member 141, the lens 142 supported by the support member 141, an adhesive 143 for joining the support member 141 and the lens 142 to each other, and the filler 144 covering the outer periphery of the support member 141 and the lens 142.

The support member 141 is formed on the surface 102 of the terrace section 101, and includes, on the top surface thereof in a view from the terrace section 101, a recess c configured to support the lens 142. The support member 141 is formed in a solid shape such as a rectangular parallelepiped, a cube or the like. The solid shape of the support member 141 has a size able to accommodate part of the lens 142 to be used and also able to secure sufficient strength to support the lens 142.

The recess c is formed on the top surface of the support member 141 to be deepened in the thickness direction of the terrace section 101, and engages with part of the lens 142. Specifically, as illustrated in FIGS. 2A and 2B, the recess c deepened downward from the top surface of the support member 141 in the vertical direction (y axis direction) is formed.

Figure 2A:
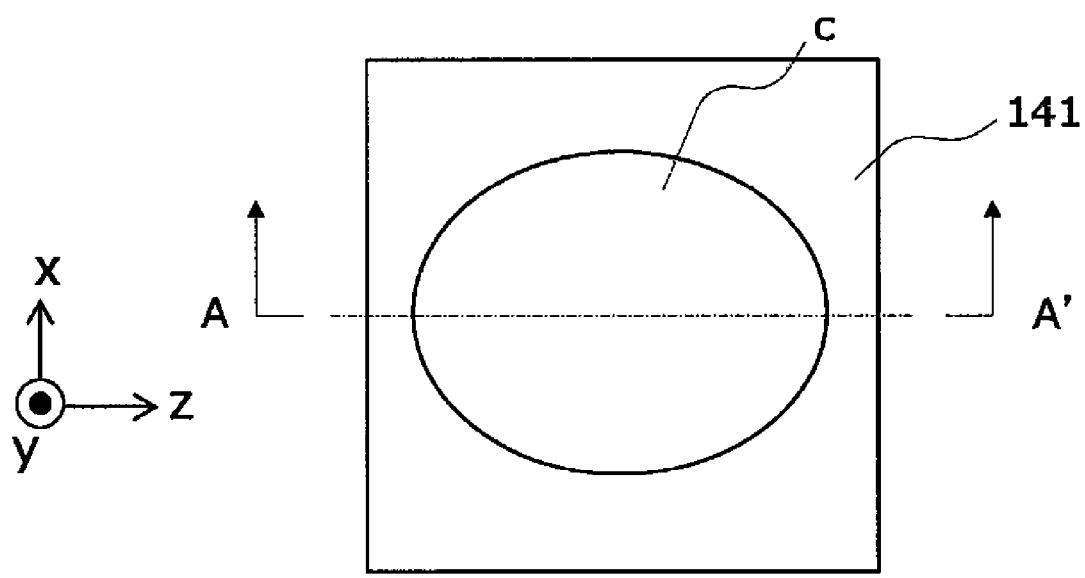
FIG. 2A is a top view of a support member according to the embodiment of the present invention.
Figure 2B:
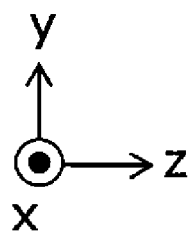
FIG. 2B is a cross-sectional view of the support member taken along a line A-A' according to the embodiment of the present invention.
Figure 2B:
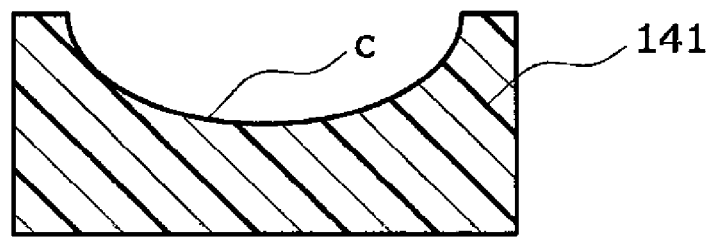

As illustrated in the top view of FIG. 2A, the diameter of a hole in the top surface forming the recess c corresponds to the diameter of a cross section of an end portion of the lens 142. In addition, the recess c has a depth corresponding to the shape and size of the end portion of the lens 142 supported by the support member 141. For example, in the example illustrated in FIGS. 2A and 2B, the recess c has a curved surface shape, and corresponds to the shape and size of a lower portion of the minute lens 142 having a curved surface outer shape, such as a ball lens, a spherical lens, or an aspheric lens. Also, the depth of the recess c is designed so that the principal point of the lens 142 coincides with the optical axis when the recess c engages with the lens 142.

The support member 141 may be formed of, for example, light curing resin as a material. The support member 141 may be formed using light curing resin by photofabrication, for example, from the surface 102 of the terrace section 101. It is more desirable that the thermal expansion coefficient of the light curing resin material be a material having a thermal expansion coefficient close to that of the waveguide substrate 100. The support member 141 may be integrally formed with the waveguide substrate 100 and the terrace section 101.

The lens 142 is disposed on the optical axis while being engaged with the recess c of the support member 141. The lens 142 controls an optical path of a light field propagating through the Si waveguide 110. More specifically, the lens 142 focuses or collimates outgoing light from the end surface of the core 11 of the Si waveguide 110 and converts the mode field of the light. The mode field of the light propagating through the Si waveguide 110 may be coupled to the eigenmode of the optical fiber 130 by the lens 142 with high efficiency.

For example, a biconvex spherical lens or an aspheric lens may be used as the lens 142. The lens 142 may use, for example, a quartz-based glass lens formed with a submicron level of accuracy and having an outer shape within several hundred micrometers. Also, in a state in which the lower portion of the lens 142 and the recess c of the support member 141 are engaged with each other, the lens 142 and the recess c are bonded with the adhesive 143 using a resin material, for example. With this, the lens 142 is fixed at a preset position on the optical axis, whereby an optical system in the connection layer 140 may be constituted.

The connection layer 140 is filled with the filler 144 in such a manner as to cover the support member 141 and the lens 142 supported by the support member 141. The filler 144 has a refractive index smaller than that of the lens 142, and may use a resin material, for example. By the connection layer 140 being filled with the filler 144, the position of the lens 142 supported by the support member 141 can be fixedly stabilized. In addition, by using the filler 144, the reflectance among the outgoing end surface of the Si waveguide 110, the minute lens 142, and the end surface of the optical fiber 130 can be reduced.

In a case where it is unnecessary to consider the stabilization in the fixing of the position of the lens 142 supported by the support member 141 formed in the connection layer 140, air or an inert gas may be used as the filler 144. Note that even when a resin adhesive or the like is used as the filler 144, the end surface of the block 120 serves as a wall, so that the filler 144 is prevented from flowing out.

The adhesive layer 150 bonds the end surface 103 of the terrace section 101, which is the end surface on the optical fiber 130 side of the waveguide substrate 100, and the end surface of the optical fiber 130. For example, an epoxy-based or acrylic-based material may be used for the adhesive layer 150.

As described above, according to the optical connection structure 1 according to the present embodiment, the support member 141 is formed on the surface 102 of the terrace section 101 formed at the end portion on the optical fiber 130 side of the waveguide substrate 100. When the recess c of the support member 141 formed in accordance with the shape and size of the lens 142 and part of the lens 142 are engaged with and fixed to each other, the lens 142 is disposed at a set position on the optical axis with respect to the outgoing end surface of the Si waveguide 110 and the end surface of the optical fiber 130. Thus, the alignment processing between the waveguide and the lens 142 is reduced, thereby making it possible to provide the optical connection structure 1 able to be more easily formed.

In addition, the optical connection structure 1 is able to constitute an optical system with high accuracy utilizing the minute lens 142 having various shapes, and couple between the waveguides for the Si waveguide 110 and the optical fiber 130 with high efficiency. Thus, it is possible to shorten the optical path length of the optical system and make the optical connection structure 1 smaller in size.

In addition, by integrally forming the support member 141 with the waveguide substrate 100, it is possible to more easily manufacture the optical connection structure 1 able to eliminate the alignment processing between the waveguide and the lens 142.

Also, it is also possible to utilize a stepped surface of the waveguide substrate 100 formed in the manufacturing process of the Si waveguide 110 as the terrace section 101, and in this case, it is possible to form the support member 141 more simply and reliably, and the lens 142 can be engaged with and fixed to the recess c of the support member 141.

Example 1

Next, an optical connection structure 1 according to Example 1 of the present invention will be described with reference to FIG. 3. Note that in the following description, the same constituent elements as those in the above-described embodiment are denoted by the same reference signs, and descriptions thereof will be omitted.

In the above-described embodiment, a case has been described in which one support member 141 is provided in the connection layer 140 to support one lens 142. In contrast, in Example 1, a plurality of support members 141 and 141b are provided, and an optical system is constituted including a plurality of lenses 142 and 142b. Hereinafter, the constituent elements different from those of the embodiment will mainly be described.

Figure 3:
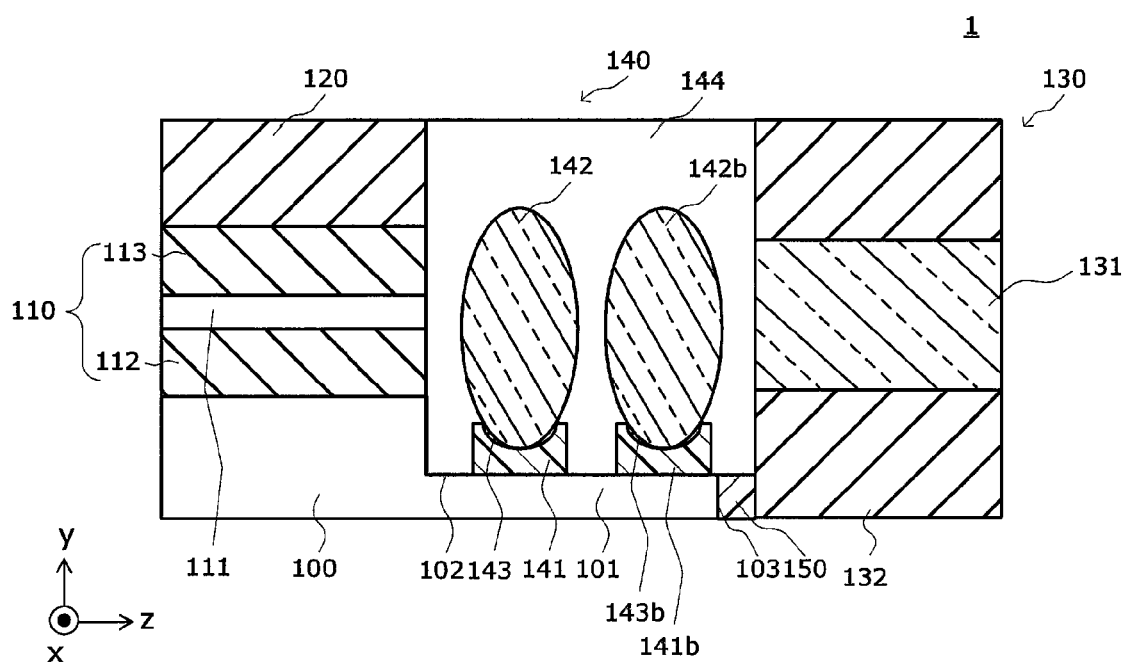
FIG. 3 is a schematic cross-sectional view of an optical connection structure according to Example 1 of the present invention.

FIG. 3 is a schematic cross-sectional view of the optical connection structure 1 according to Example 1. The optical connection structure 1 according to the present example, similarly to the embodiment described above, includes the waveguide substrate 100 having the terrace section 101, the Si waveguide 110, the block 120, the optical fiber 130, the connection layer 140, and the adhesive layer 150.

The connection layer 140 includes the plurality of support members 141 and 141b, and the plurality of lenses 142 and 142b. In the connection layer 140 illustrated in FIG. 3, a collimating optical system is constituted by two minute lenses 142 and 142b. The lens 142 on the Si waveguide 110 side converts emitted light outputted from the Si waveguide 110 to collimated light. The lens 142b on the optical fiber 130 side focuses the collimated light from the lens 142 onto a core 131 of the optical fiber 130. Alternatively, the lens 142b in the subsequent stage may be a lens having an aberration correction effect in addition to the focusing effect.

The support members 141 and 141b are formed with dimensions corresponding to the shapes and sizes of the lenses 142 and 142b, respectively. A recess c of the support member 141 and a recess c of the support member 141b are respectively engaged with a lower portion of the lens 142 and a lower portion of the lens 142b, and are fixed to each other with adhesives 143 and 143b. The depth (y axis direction) of each of the recesses c of the support members 141 and 141b has a depth designed such that, when the support members 141 and 141b are engaged with the lenses 142 and 142b respectively, and are erected on a surface 102 of the terrace section 101, the lenses 142 and 142b are positioned on the optical axis.

As described above, according to Example 1, since the lens 142 supported by the support member 141 is formed in two or more sets along the optical axis, the optical system in the connection layer 140 may be constituted more flexibly. Even when the plurality of support members 141 and 141b and the plurality of lenses 142 and 142b are provided, it is possible to easily form the optical connection structure 1, in which the known alignment processing is reduced, and an outgoing end surface of the Si waveguide 110, the optical system, and an end surface of the optical fiber 130 are disposed at predetermined positions.

Example 2

Figure 4A:
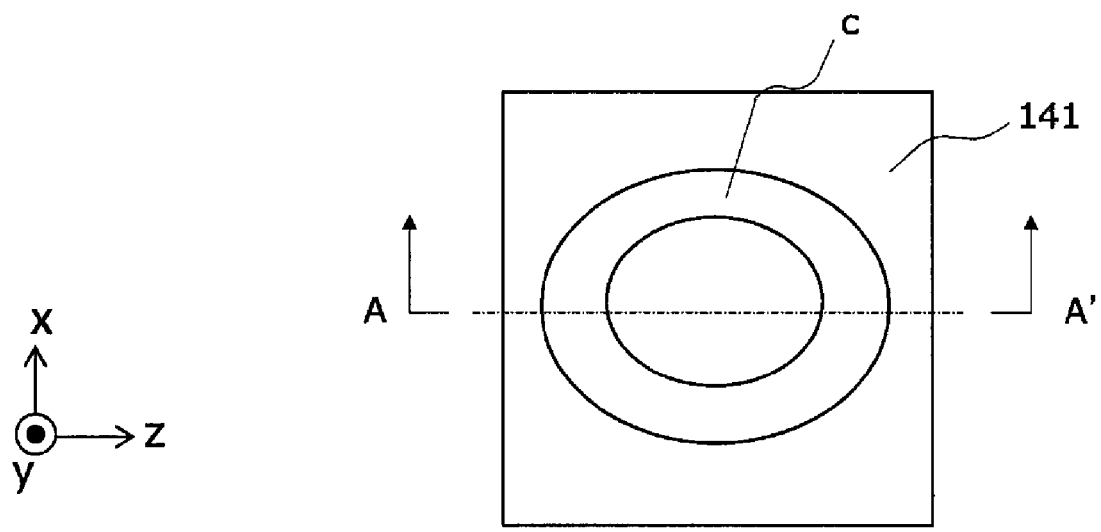
FIG. 4A is a top view of a support member according to Example 2 of the present invention.

Next, the support member 141 included in the optical connection structure 1 according to Example 2 of the present invention will be described with reference to FIGS. 4A and 4B. Note that in the following description, the same constituent elements as those in the above-described embodiment and Example 1 are denoted by the same reference signs, and descriptions thereof will be omitted.

In each of the above-described embodiment and Example 1, a case in which the recess c of the support member 141 has a curved surface shape has been described. In contrast, in Example 2, as another example of the support member 141 configured to support the lens 142 having a curved surface outer shape, a support member 141 provided with a recess c having an inverted truncated cone shape as the recess c, is used as illustrated in FIGS. 4A and 4B. As illustrated in a top view of FIG. 4A, a circular hole is formed in a top surface of the support member 141. The diameter of this circular hole corresponds to the diameter of a cross section of the lower portion of the lens 142 to be used.

Figure 4B:
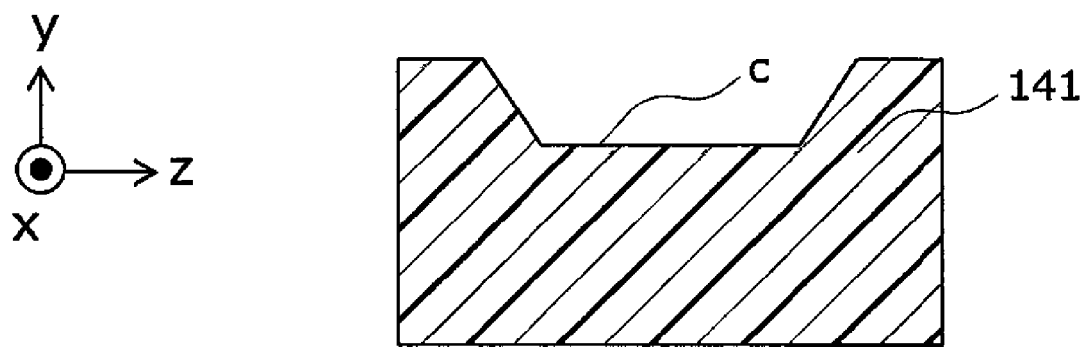
FIG. 4B is a cross-sectional view of the support member taken along a line A-A' according to Example 2 of the present invention.

Furthermore, as illustrated in a cross-sectional view of FIG. 4B, a flat plane is formed at the deepest portion of the recess c. The lower portion of the lens 142 is engaged with the recess c of the support member 141, and is fixed thereto with the adhesive 143. With this, the lens 142 is supported and is erected on the surface 102 of the terrace section 101. The depth and width of the recess c of the support member 141 is formed corresponding to the size of the lens 142 to be used, so that the lens 142 is disposed on the optical axis.

Example 3

Next, the optical connection structure 1 according to Example 3 of the present invention will be described with reference to FIGS. 5A and 5B. Note that in the following description, the same constituent elements as those in the above-described embodiment are denoted by the same reference signs, and descriptions thereof will be omitted.

In the above-described embodiment, Example 1, and Example 2, cases have been described, in each of which the shape of the recess c provided in the support member 141 has a shape corresponding to the lens 142 having a spherical outer shape such as a spherical lens, an aspheric lens or the like. In contrast, the support member 141 according to Example 3 includes a recess c configured to support the lens 142 having a columnar shape.

Figure 5A:
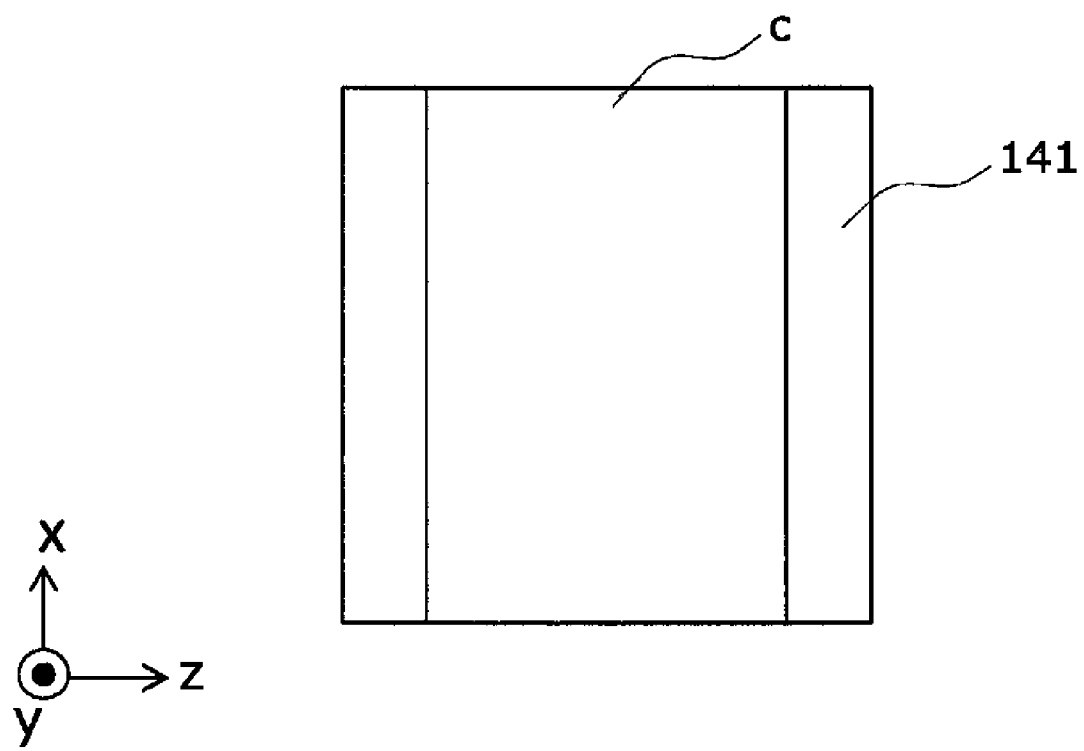
FIG. 5A is a top view of a support member according to Example 3 of the present invention.
Figure 5B:
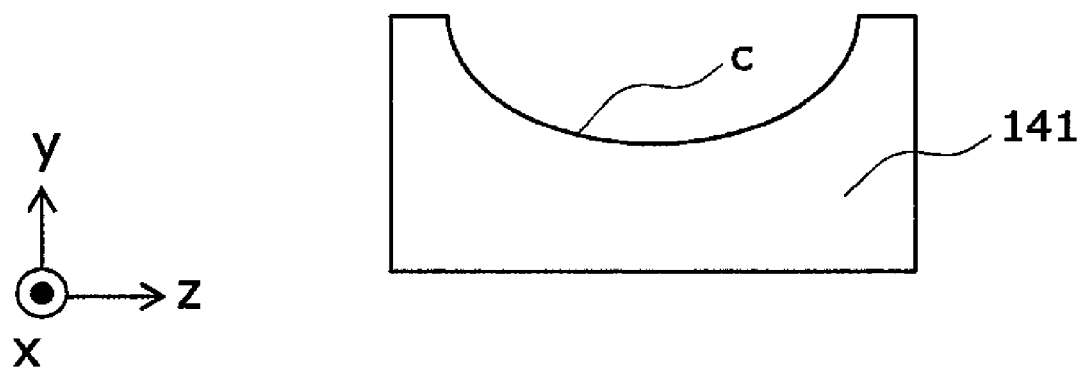
FIG. 5B is a side view of the support member according to Example 3 of the present invention.

As illustrated in a top view of FIG. 5A, a groove is formed as the recess c in the support member 141 along the x axis direction. Further, as illustrated in a side view of FIG. 5B, the recess c forms a convex arc in the vertical direction (y axis direction). As described above, the recess c includes a semi-cylindrical or semi-elliptical columnar groove corresponding to the outer surface shape of the columnar lens 142 such as a rod lens, a cylindrical lens or the like.

When a part in the longitudinal direction of the cylindrical lens 142 and the recess c of the support member 141 are engaged and fixed to each other with the adhesive 143, the lens 142 is disposed on the optical axis.

As described above, according to Example 3, even when the minute cylindrical lens 142 is used, the lens 142 can be simply and accurately disposed on the optical axis.

Example 4

Next, the optical connection structure 1 according to Example 4 of the present invention will be described with reference to FIGS. 6A and 6B. Note that in the following description, the same constituent elements as those in the above-described embodiment are denoted by the same reference signs, and descriptions thereof will be omitted.

In Example 3, a case in which the recess c of the support member 141 includes a semi-elliptical columnar groove has been exemplified and described. In contrast, a recess c in Example 4 includes a V-shaped groove.

Figure 6A:
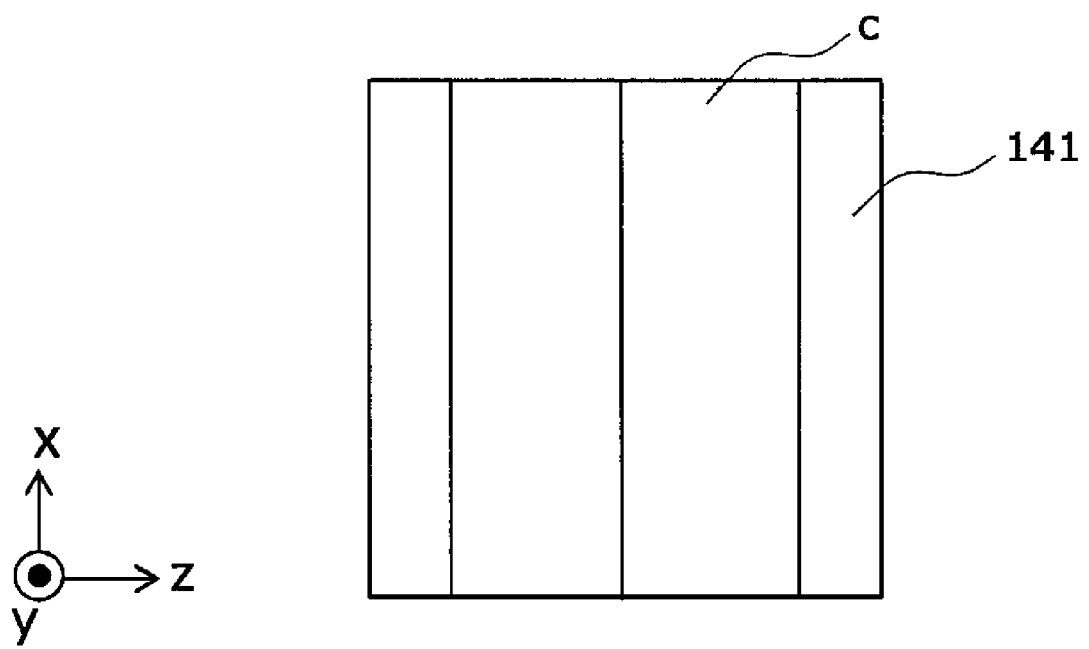
FIG. 6A is a top view of a support member according to Example 4 of the present invention.
Figure 6B:
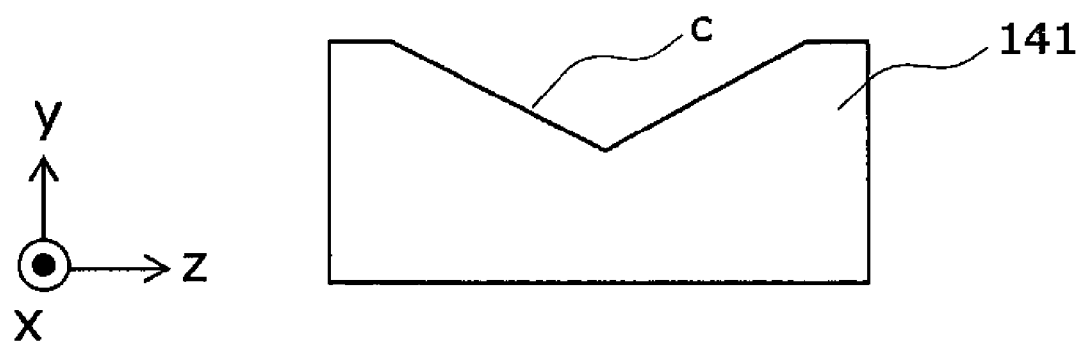
FIG. 6B is a side view of the support member according to Example 4 of the present invention.

As illustrated in a top view of FIG. 6A, a groove is formed as the recess c along the x axis direction on a top surface of the support member 141. Further, as illustrated in a side view of FIG. 6B, the recess c is formed in a V shape.

When the above-described recess c of the support member 141 and a part in the longitudinal direction of the lens 142 formed in a cylindrical shape, such as a rod lens, cylindrical lens or the like, are locked and fixed to each other with the adhesive 143, the lens 142 is disposed on the optical axis. Further, even when the lens 142 formed in a prismatic shape is used, the recess c and corners in the longitudinal direction of the lens 142 are engaged and fixed to each other with the adhesive 143, so that the lens 142 may be disposed on the optical axis.

As described above, according to Example 4, even when the minute lens 142 formed in a cylindrical or prismatic shape is used, the lens 142 can be simply and accurately disposed on the optical axis.

Example 5

Next, the optical connection structure 1 according to Example 5 of the present invention will be described with reference to FIGS. 7A and 7B. Note that in the following description, the same constituent elements as those in the above-described embodiment are denoted by the same reference signs, and descriptions thereof will be omitted.

In Example 4, the support member 141 with the recess c formed to engage with a part in the longitudinal direction of the lens 142 having a cylindrical or prismatic shape, has been exemplified and described. In contrast, the support member 141 according to Example 5 includes a recess c configured to engage with a lower portion of the lens 142, where the longitudinal direction of the lens 142 formed in a cylindrical shape is taken as the vertical direction (y axis direction).

Figure 7A:
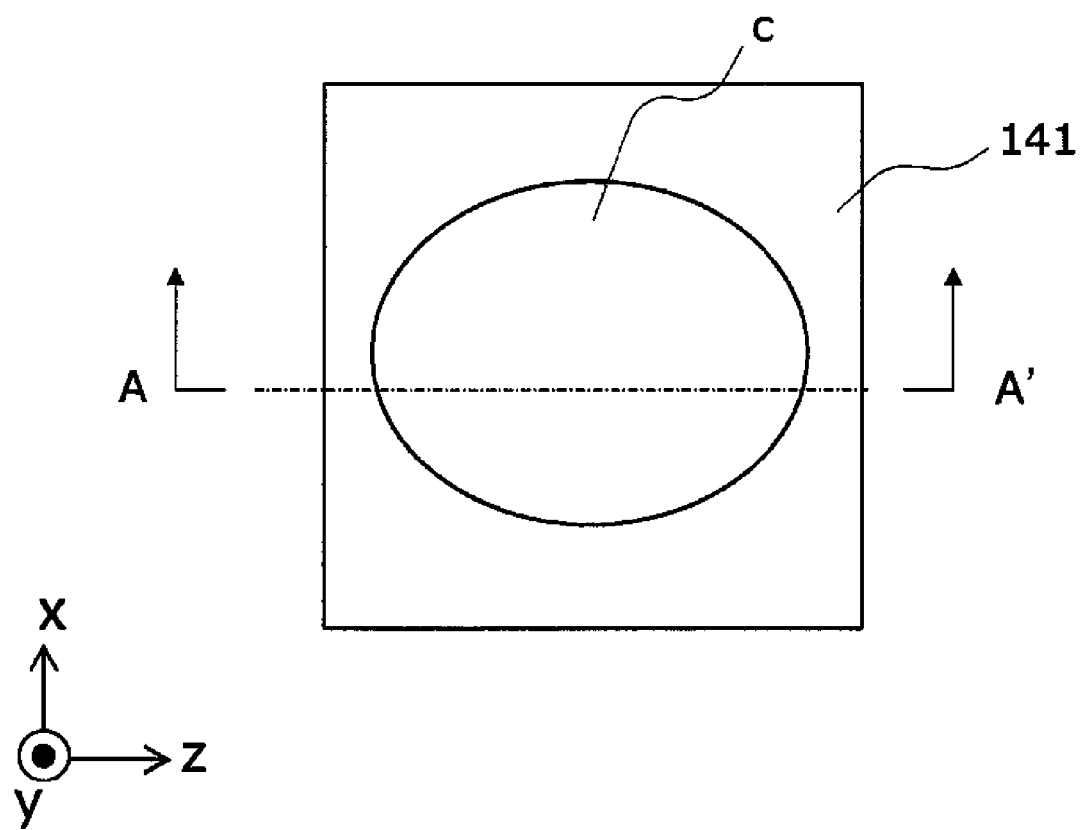
FIG. 7A is a top view of a support member according to Example 5 of the present invention.
Figure 7B:
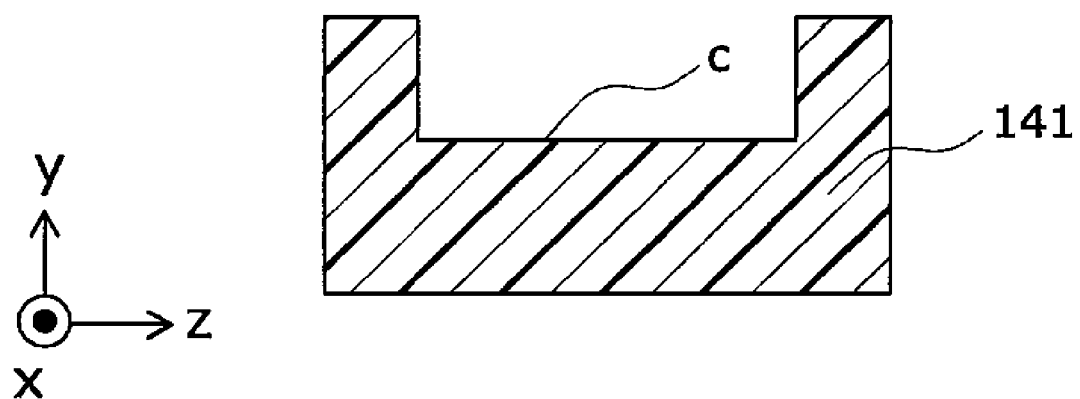
FIG. 7B is a cross-sectional view of the support member taken along a line A-A' according to Example 5 of the present invention.

More specifically, as illustrated in a top view of FIG. 7A, a hole having an elliptical shape is formed in a top surface of the support member 141. The diameter of this hole corresponds to the size of the diameter of the cylindrical lens 142. In addition, as illustrated in a cross-sectional view of FIG. 7B, the depth of the rectangular-shaped recess c corresponds to the length of an end portion in the longitudinal direction of the cylindrical lens 142.

The recess c of the support member 141 and the end portion in the longitudinal direction of the cylindrical lens 142 are engaged and fixed to each other with the adhesive 143, and the lens 142 is disposed on the optical axis.

As described above, according to Example 5, even when the longitudinal direction of the minute cylindrical lens 142 is used as the vertical direction (y axis direction), the lens 142 can be simply and accurately disposed on the optical axis.

Example 6

Next, the optical connection structure 1 according to Example 6 of the present invention will be described with reference to FIGS. 8A to 9. Note that in the following description, the same constituent elements as those in the above-described embodiment are denoted by the same reference signs, and descriptions thereof will be omitted.

The recess c of the support member 141 according to each of the above-described embodiment and Examples 1 to 5 has been described using the case in which the recess c engages with part of the lens 142, such as the lower portion of the lens 142. In contrast, in Example 6, the support member 141 supports the lens 142, where a lens plane being a spherical or aspheric surface is formed on each of opposing surfaces of a sheet-like structure, as illustrated in FIG. 9.

Figure 8A:
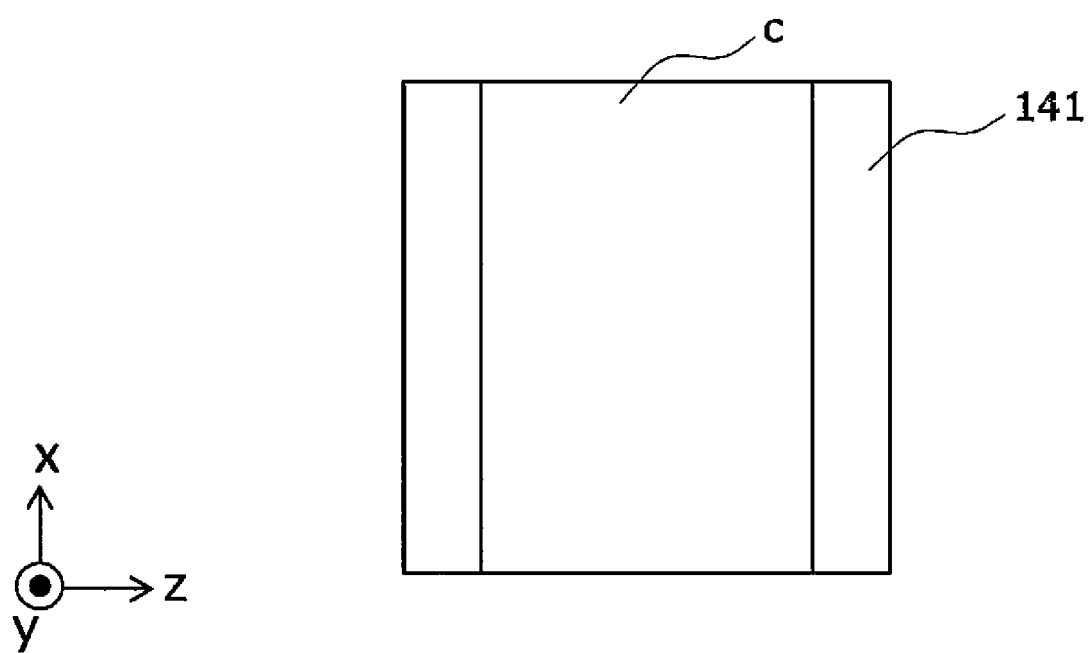
FIG. 8A is a top view of a support member according to Example 6 of the present invention.
Figure 8B:
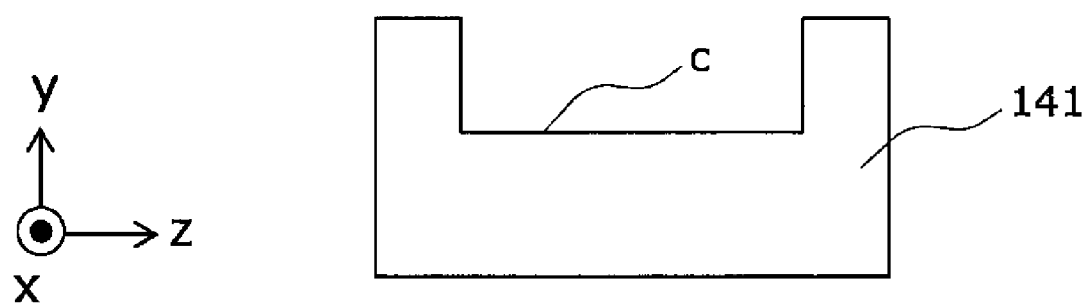
FIG. 8B is a side view of the support member according to Example 6 of the present invention.

To be more specific, as illustrated in a top view of FIG. 8A, a groove is formed as a recess c on a top surface of the support member 141 along the horizontal direction (x axis direction). As illustrated in a side view of FIG. 8B, the recess c having a rectangular shape when viewed from the side is formed in the support member 141. In this manner, the cuboid-shaped recess c is provided in the support member 141. The depth (y axis direction), the length in the x axis direction, and the length in the z axis direction of the recess c correspond to the size of an end portion of the sheet-like structure where the lens planes are formed.

Figure 9:
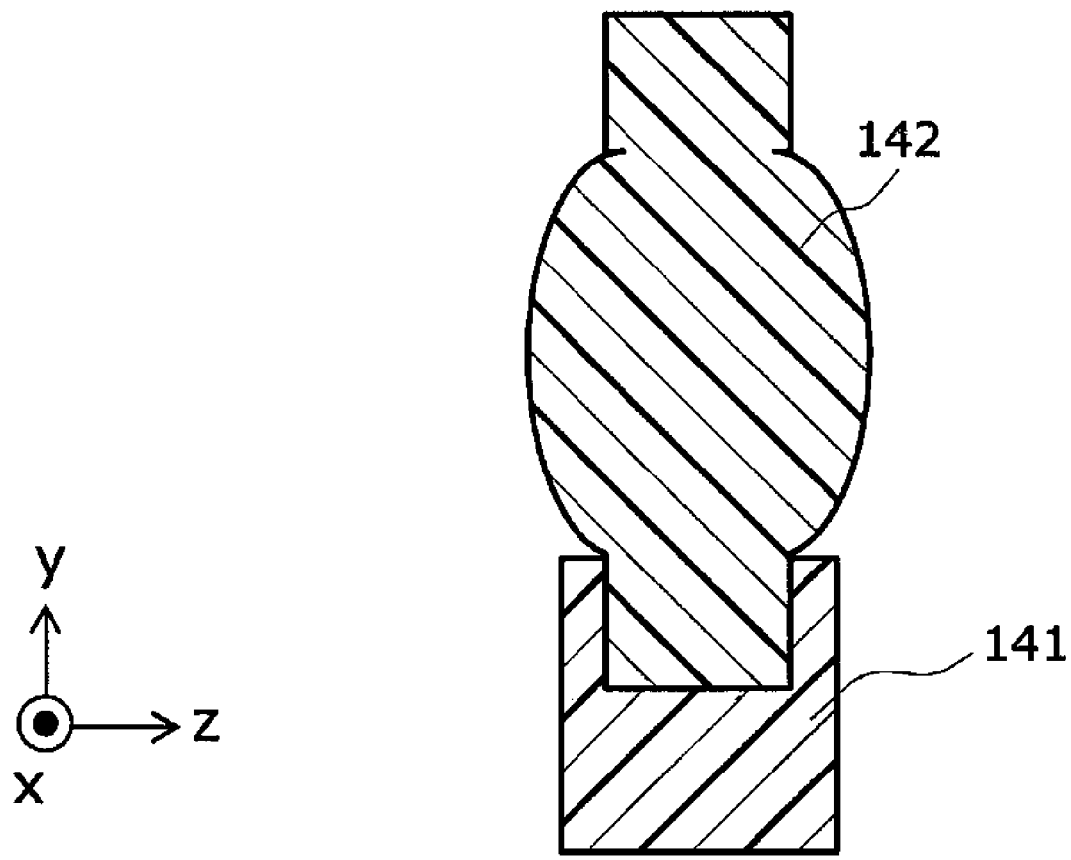
FIG. 9 is a cross-sectional view of the support member according to Example 6 of the present invention.
Figure 10:
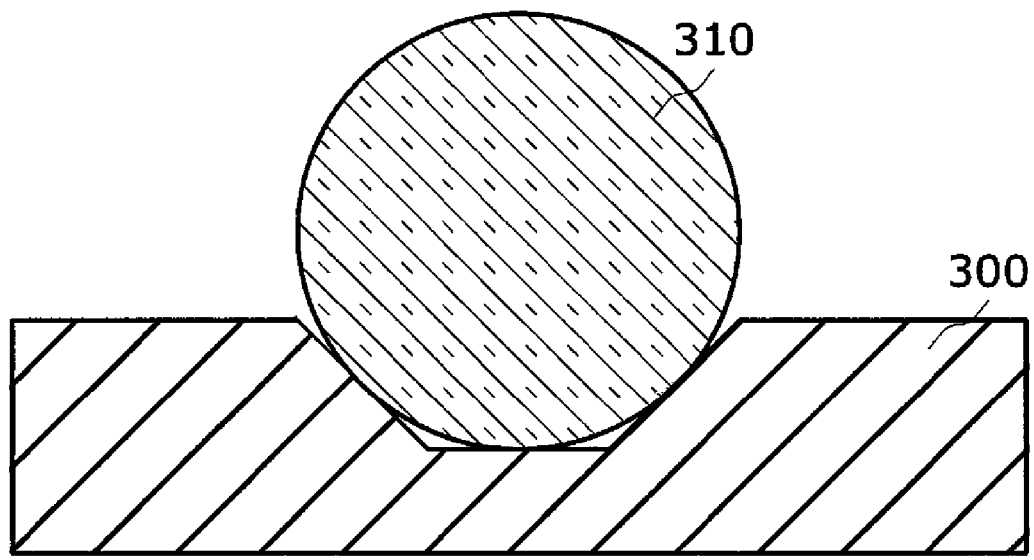
FIG. 10 is a schematic cross-sectional view of an optical connection structure according to an example of related art.

As illustrated in FIG. 9, the recess c of the support member 141 and the end portion of the sheet-like structure where the lens 142 is formed are engaged and fixed to each other with the adhesive 143, and the lens 142 is disposed on the optical axis.

In the present example, the minute lens 142 may use a lens having a gradient index along the mode field plane of the Si waveguide 110. Since the outer shape of the above-mentioned gradient index lens 142 takes a cuboid shape, the bottom of the cuboid shape and the groove formed as the recess c of the support member 141 engage with each other.

As described above, according to Example 6, even in the case of using the minute lens 142, where the lens plane is formed on the surface of the sheet-like structure, the lens 142 can be simply and accurately disposed on the optical axis by using the cuboid-shaped recess c corresponding to the shape of the sheet-like structure.

Although the embodiment of the optical connection structure of the present invention has been described thus far, the present invention is not limited to the above-described embodiment and can be modified into various forms that can be conceived by a person skilled in the art within the scope of the invention described in the claims.

For example, in the embodiment described above, a case has been exemplified and described in which the terrace section 101 has a thickness (y axis direction) thinner than the thickness of the region where the Si waveguide 110 is formed in the waveguide substrate 100. However, the terrace section 101 may be formed to have a thickness equal to or thicker than the thickness of the region where the Si waveguide 110 is formed.

Further, a case has been exemplified and described in which the thickness of the terrace section 101 is constant from the outgoing end surface side of the Si waveguide 110 toward the end surface of the optical fiber 130. However, the thickness of the terrace section 101 is not limited to a constant thickness. For example, the thickness thereof may be formed so as to be gradually thinned from the outgoing end surface side of the Si waveguide 110 toward the end surface of the optical fiber 130.

Note that in the embodiment described above, a case has been described in which the core 111 of the Si waveguide 110 and the waveguide substrate 100 are formed of a Si material, but the material is not limited to Si. For example, these constituent elements may be formed of any of other semiconductor materials such as compound semiconductors, inorganic materials, and organic materials.

Also, in the embodiment described above, a case in which the lens 142 is formed of a glass material has been exemplified. However, the lens 142 may be formed using a resin material, a semiconductor material, or a ceramic material. In addition, the lens 142 may be a lens formed by fine processing, in addition to a mold lens. Furthermore, the lens 142 may be a refractive lens or a diffraction lens.

REFERENCE SIGNS LIST

1 Optical connection structure
100 Waveguide substrate
101 Terrace section
102 Surface
103 End surface
110 Si waveguide
111 Core
112 Lower clad
113 Upper clad
120 Block
130 Optical fiber
131 Core
132 Clad
140 Connection layer
141 Support member
142 Lens
143 Adhesive
144 Filler
150 Adhesive layer
c Recess.

The invention claimed is:

1. An optical connection structure comprising:
   a substrate including an end surface;
   a first waveguide on a first surface of the substrate, the first waveguide including an end surface;
   a block over and contacting an upper surface of the first waveguide;
   a second waveguide including an end surface facing the end surface of the first waveguide and facing an end surface of the block, wherein a lengthwise dimension of the first waveguide and a lengthwise dimension of the second waveguide each extend along a first direction;
   a terrace extending toward the second waveguide from the end surface of the substrate, the end surface of the substrate facing the second waveguide;
   a support member on the terrace, wherein a top surface of the support member includes a recess supporting an optical element, and wherein a lengthwise dimension of the recess extends along a second direction perpendicular to the first direction; and
   a filler disposed between the first waveguide and the second waveguide, disposed between the block and the second waveguide, and covering the support member and the optical element, wherein the filler extends continuously from the end surface of the block to the end surface of the second waveguide, and wherein the filler is made of a resin material having a refractive index smaller than a refractive index of the optical element.

2. The optical connection structure according to claim 1, wherein the recess is configured to engage with part of the optical element.

3. The optical connection structure according to claim 2, further comprising:
   an adhesive configured to bond the optical element to the support member.

4. The optical connection structure according to claim 2, wherein the recess corresponds to a shape and a size of a part of the optical element that the recess is configured to engage with.

5. The optical connection structure according to claim 2, wherein the recess has a curved shape.

6. The optical connection structure according to claim 2, further comprising:
   a connection layer that is formed of a material having a refractive index smaller than a refractive index of the optical element, wherein the connection layer covers the support member and the optical element between the end surface of the first waveguide and the end surface of the second waveguide.

7. The optical connection structure according to claim 2, wherein the support member is constituted of a light cured resin material.

8. The optical connection structure according to claim 2, further comprising a second support member on the terrace, wherein a second top surface of the second support member includes a second recess configured to support a second optical element.

9. A method comprising:
   providing an optical connection structure, the optical connection structure comprising:
      a substrate including an end surface;
      a first waveguide on a first surface of the substrate, the first waveguide including an end surface;
      a block over and contacting an upper surface of the first waveguide;
      a second waveguide including an end surface facing the end surface of the first waveguide and facing an end surface of the block, wherein a lengthwise dimension of the first waveguide and a lengthwise dimension of the second waveguide each extend along a first direction;

a terrace extending toward the second waveguide from the end surface of the substrate, the end surface of the substrate facing the second waveguide; and a support member on the terrace, wherein a top surface of the support member includes a recess;

supporting, by the recess, an optical element, and wherein a lengthwise dimension of the recess extends along a second direction perpendicular to the first direction; and forming a filler between the first waveguide and the second waveguide, between the block and the second waveguide, and covering the support member and the optical element, wherein the filler extends continuously from the end surface of the block to the end surface of the second waveguide, and wherein the filler is made of a resin material having a refractive index smaller than a refractive index of the optical element.

10. The method according to claim 9, further comprising:
bonding, with an adhesive, the optical element to the support member.

11. The method according to claim 9, further comprising:
covering, with a connection layer the support member and the optical element between the end surface of the first waveguide and the end surface of the second waveguide, wherein the connection layer is formed of a material having a refractive index smaller than a refractive index of the optical element.

12. The method according to claim 9, wherein the support member is constituted of a light cured resin material.

13. The method according to claim 9, wherein the optical connection structure further comprises a second support member on the terrace, wherein a second top surface of the second support member includes a second recess configured to support a second optical element.

14. The method according to claim 9, wherein the optical element is a lens.

15. The method according to claim 9, wherein an end face of the terrace faces a clad of the second waveguide, and wherein the end face of the terrace is adhered to the clad of the second waveguide by an adhesive that extends continuously from the end face of the terrace to an end face of the clad of the second waveguide.

16. The method according to claim 11, wherein a top surface of the connection layer is level with top surfaces of the first waveguide and the second waveguide.

17. The optical connection structure according to claim 1, wherein the optical element is a lens.

18. The optical connection structure according to claim 1, wherein an end face of the terrace faces a clad of the second waveguide, and wherein the end face of the terrace is adhered to the clad of the second waveguide by an adhesive that extends continuously from the end face of the terrace to an end face of the clad of the second waveguide.

19. The optical connection structure according to claim 6, wherein a top surface of the connection layer is level with top surfaces of the first waveguide and the second waveguide.

* * * * *